Oct. 22, 1968

D. HACKEY 3,406,571

GOLF PRACTICE DEVICE INCLUDING DISTANCE AND DEVIATION
MEASUREMENT INDICATORS

Filed Jan. 14, 1964

INVENTOR:
DONALD HACKEY
BY
*Browne, Schuyler + Beveridge*
ATTORNEYS

Oct. 22, 1968  D. HACKEY  3,406,571
GOLF PRACTICE DEVICE INCLUDING DISTANCE AND DEVIATION
MEASUREMENT INDICATORS
Filed Jan. 14, 1964  3 Sheets-Sheet 3
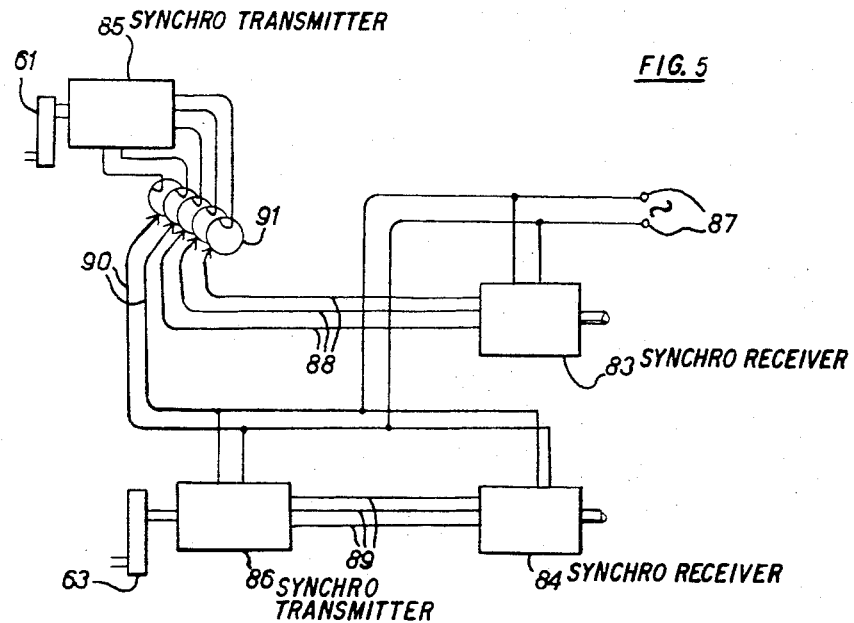
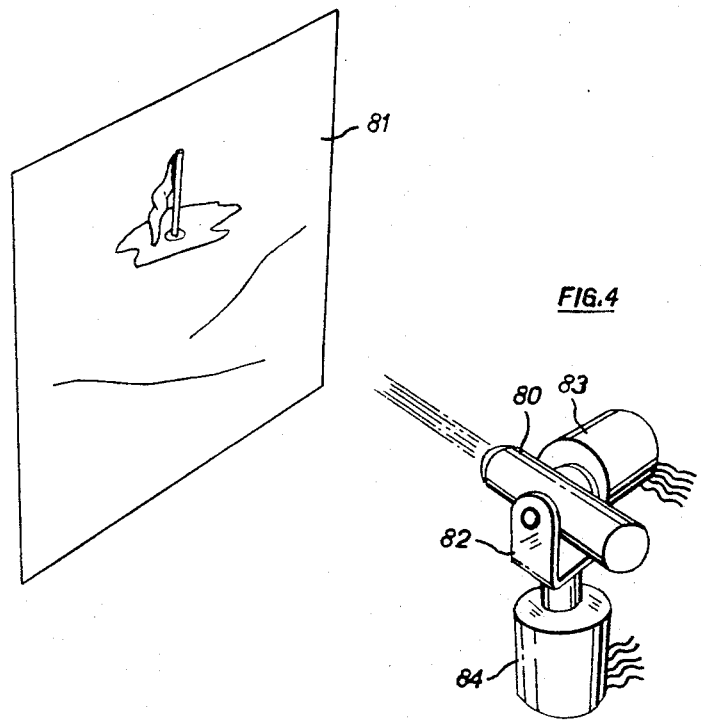
INVENTOR:
DONALD HACKEY
BY
Browne, Schuyler & Burridge
ATTORNEYS 3,406,571
Patented Oct. 22, 1968

3,406,571
GOLF PRACTICE DEVICE INCLUDING DISTANCE
AND DEVIATION MEASUREMENT INDICATORS
Donald Hackey, Hazel Grove, near Stockport, England, assignor to Standon Associates Limited, Salford, England, a British company
Filed Jan. 14, 1964, Ser. No. 337,606
Claims priority, application Great Britain, Jan. 15, 1963, 1,704/63
7 Claims. (Cl. 73—379)

The present invention relates to golf practice equipment and has for an object the provision of apparatus which may be used in a comparatively confined space for practising golf and which gives some indication as to the flight a struck ball would have taken had it been free to do so.

According to the present invention, apparatus for practising golf comprises a dummy golf ball mounted for initial movement in several dimensions upon being struck with a golf club, means for absorbing the energy imparted to the golf ball by being struck and means for indicating the initial direction of motion of the golf ball upon being struck.

In a preferred embodiment of the invention, a dummy golf ball is attached by a stem to a spindle pivoted horizontally in a frame, the frame itself being pivotable about a vertical axis offset from the horizontal axis of the spindle. Such spindle is connected by a stepdown gear to a suitable movement-indicating device such as a potentiometer or a synchro transmitter. The frame is also coupled to a potentiometer or synchro transmitter. When potentiometers are used, the one coupled to the spindle mounting the dummy golf ball is calibrated to indicate the distance the ball would have travelled had it been a real ball, and the other is calibrated in degrees to indicate any deviation from the desired flight. When a synchro system is used, the synchro receivers are coupled to move a projected spot of light across a screen on which is drawn or projected a picture of a fairway of a golf course. The synchro receiver connected to the transmitter which is driven by the spindle mounting the dummy golf ball is coupled to the light projector to pivot the projector vertically, whilst the other synchro receiver is coupled to the light projector to turn the projector horizontally.

The invention is further described by way of example with reference to the accompanying drawings, wherein:

FIG. 4 is a diagrammatic perspective view of a light projector and screen of a further embodiment of apparatus according to the invention; and FIG. 5 is a circuit diagram of said further embodiment.

Figure 1:
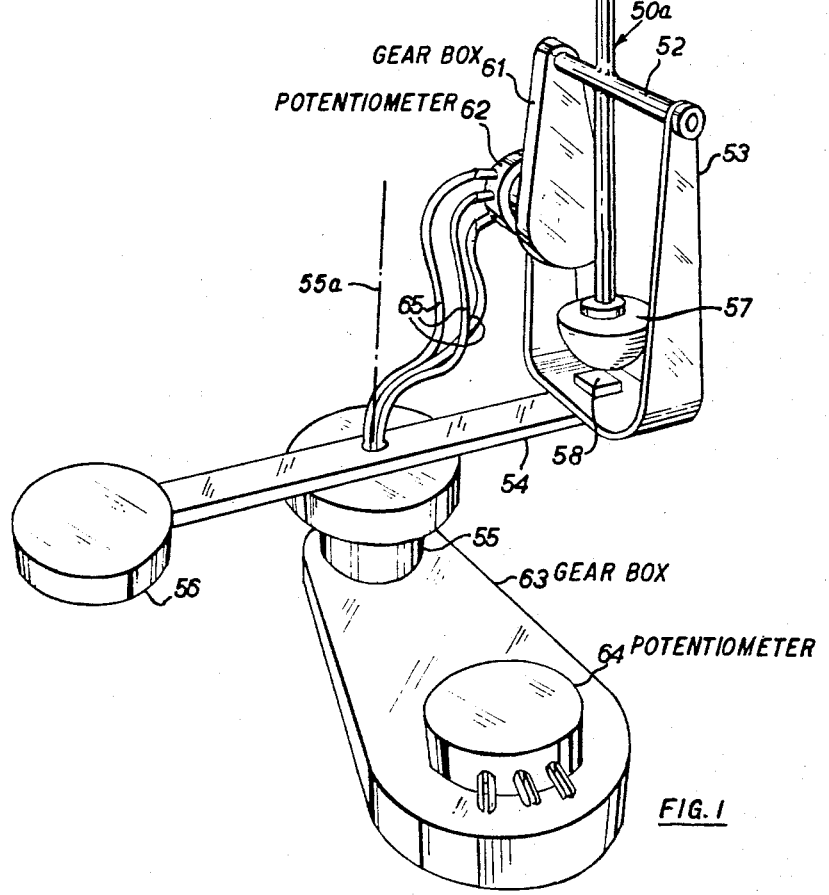
FIG. 1 is a diagrammatic perspective view of the principal parts of one embodiment of apparatus according to the invention.

In the embodiment of apparatus shown in FIG. 1, a rotor 50a includes a dummy golf ball 50 which is attached by a stem 51 to a spindle 52. The spindle 52 is pivoted about a horizontal axis between forked arms 53 of a frame 54 so that the rotor 50a can rotate in the frame 54 with friction but without obstruction. The frame 54 is pivoted about a vertical axis 55a in a bearing 55, such vertical axis being offset from the axis of the spindle 52. Thus the ball 50 is capable of moving in a vertical plane through said vertical axis 55a. The frame 54 is provided with a counterweight 56 and the rotor 50a includes with a counterweight 57 diametrically opposite to the dummy ball 50 so that the rotor 50a is statically and dynamically balanced as is the frame 54 with the rotor 50a thereon. A small permanent magnet 58 is arranged below the spindle 52 and serves to attract the counterweight 57 to hold the dummy ball 50 in its uppermost position, illustrated, preparatory to being struck.

The apparatus shown in FIG. 1 is mounted below a platform 59 (only a small portion of which is shown) upon which the practiser stands. The dummy ball 50 protrudes through a suitable aperture 60 in the platform.

The spindle 52 is connected by mechanical coupling means comprising step-down gearing, for example of 50:1 ratio, contained in a gearbox 61 to the slider of a circular type potentiometer 62 which serves as a first electromechanical transducer. The frame 54 is connected by mechanical coupling means comprising gearing, contained in a gearbox 63 to the adjustable slider of a circular type potentiometer 64 which serves as a second electromechanical transducer. The electrical terminals of the potentiometer 62 are connected by wires 65 to three slip-rings (not seen in FIG. 1) arranged below the gearbox 63.

Figure 2:
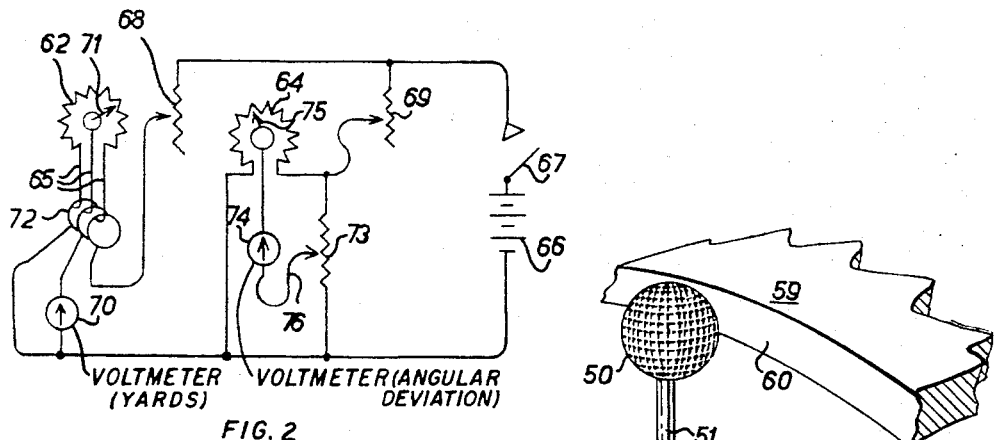
FIG. 2 is a circuit diagram of the apparatus of FIG. 1.

The circuit diagram of the apparatus of FIG. 1 is shown more fully in FIG. 2 to which reference will now be made. The electrical circuitry of the apparatus is provided with power from a suitable source, such as a battery 66, through a manual switch 67. The potentiometer 62 is connected in series with a rheostat 68 whilst the potentiometer 64 is connected in series with a rheostat 69. A voltmeter 70 is connected between the adjustable slider 71 of the potentiometer 62 and one end of this potentiometer. Since the potentiometer 62 is mounted on a part of the apparatus designed to rotate, the three leads 65 from the potentiometer 62 and its slider 71 are connected to three slip-rings 72 (shown diagrammatically) which are contacted by suitable brushes connected to the power source, the rheostat 68 and the voltmeter 70. A voltage divider 73 is connected in parallel with the potentiometer 64. A voltmeter 74 is connected between the adjustable slider of the potentiometer 64 and an adjustable slider 76 of the voltage divider 73. The voltmeter 70 may be calibrated to read directly in yards and the voltmeter 74 may be calibrated to read directly in degrees. The voltage divider 73 serves to set the zero of the voltmeter 74 whilst the rheostats 68 and 69 serve to adjust the full-scale readings of the voltmeters 70 and 74.

The meters 70 and 74 may be conveniently located in recesses in the platform 59.

In use of the apparatus, the number of times which the spindle 52 will rotate upon the ball 50 being struck will depend upon how hard the ball is struck. The ball 50 will ultimately come to rest because of the inherent friction in the bearings journalling the spindle 52, in the gearbox 61 and in the potentiometer 62. The gear ratio of the gearbox 61 is chosen so that the slider 71 of the potentiometer 62 will never be turned a full revolution under the maximum impact which in practice can be applied to the ball 50. The initial voltage applied to the voltmeter 70 is zero and the final voltage is dependent upon the final position of the adjustable slider 71, which in turn depends upon how hard the ball 50 is hit. If the ball 50 is hit truly, the frame 54 will not turn in the bearing 55. However, if the ball 50 is sliced, the frame turns, the angle of turning of the frame depending upon how heavily the ball is sliced. The gear ratio of the gearbox 63 is chosen so that the adjustable slider 75 of the potentiometer 64 is, in practice, always turned through less than 180°. Since the ball may be sliced either way, the slider 75 is initially set in its mid position. So that the voltmeter 74 will give a centre-scale zero reading, the voltage divider 73 is adjusted until no voltage is applied to the voltmeter 74 and the zero reading is obtained. The polarity of the voltage finally applied to the voltmeter 75 will depend upon which way the ball is sliced.

Figure 3:
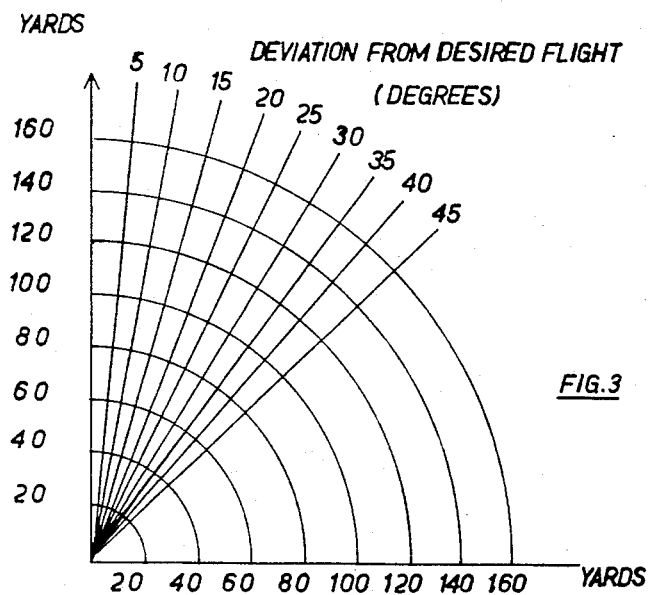
FIG. 3 is a chart for use with the apparatus of FIG. 1.

The chart shown in FIG. 3 may be used to obtain a better indication of the fall the ball would have had, had it been a real one. This chart is marked to show the range in yards and the deviation of its flight, if any, in degrees. The chart enables one to see at a glance how far the ball lands from the desired position.

In a refinement of the apparatus, a projector as shown in FIG. 4 is employed. This projector 80 is adapted to form a spot of light upon a screen 81 on which is drawn the fairway and a hole of a golf course. This screen 81 is so positioned relative to the dummy tee upon which the dummy golf ball is mounted that the practiser takes aim at the hole on the screen 81. The projector 80 is mounted for pivoting in a vertical plane in a frame 82 which is itself horizontally pivotable. A synchro receiver 83 is used for pivoting the projector 80 vertically and a synchro receiver 84 is used for swinging the projector 80 horizontally. To enable the projector to be used with the apparatus of FIG. 1, such apparatus is suitably modified by replacing the potentiometers 62 and 64, serving as electro-mechanical transducers, by the synchro transmitters 85 and 86 shown in FIG. 5 of the drawings. Thus the rotary inputs of the synchro transmitters 85 and 86 are coupled by the gearboxes 61 and 63 to the spindle 52 and the frame 54 of FIG. 1, respectively. Single-phase A.C. power for the synchro systems is applied to suitable terminals 87. The transmitter 85 is connected through three-phase leads 88 to the receiver 83 and the transmitter 86 is connected through three-phase leads 89 to the receiver 84. Thus a rotary movement applied to the transmitter 85 or 86 by the spindle 52 or the frame 54 respectively causes the receiver 83 or 84 to correspondingly tilt the projector 80 or turn the frame 82 respectively. Since the transmitter 85 is mounted on a part which rotates, the A.C. leads 90 to the transmitter 85 and the three-phase leads 88 contain slip rings 91.

The gear ratios of the gearboxes 61 and 63 are so chosen that when the dummy ball 50 is struck, the spot of light formed by the projector 80 is moved over the screen 81 to a position corresponding to that at which the ball would have fallen, had it been a real ball.

I claim:

1. Apparatus for practising golf comprising a base; a frame; means journalling said frame to said base for rotation about a vertical axis; a rotor; means journalling said rotor on said frame for rotation about a horizontal axis offset from said vertical axis, said rotor including a dummy golf ball and a first counterweight which are radially spaced from said horizontal axis on opposite sides thereof whereby said rotor is dynamically balanced about said horizontal axis, said golf ball being positioned on said rotor for movement in a vertical plane passing through said vertical axis, said frame including a second counterweight statically balancing said frame and said rotor journalled thereon; a first electro-mechanical transducer; first means mechanically coupling said first transducer to said rotor so that said first transducer is continuously responsive to angular displacement of said rotor about said horizontal axis from an initial position; a second electro-mechanical transducer; second means mechanically coupling said second transducer to said frame so that said second transducer is continuously responsive to angular displacement of said frame about said vertical axis from an initial position; and means responsive to said transducers for representing the angular displacement of said rotor about said horizontal axis as a distance and the angular displacement of said frame about said vertical axis as an angular deviation.

2. Apparatus according to claim 1 wherein said means mechanically coupling said first transducer to said rotor comprises reduction gear means.

3. Apparatus according to claim 1 wherein said means mechanically coupling said second transducer to said frame comprises gearing means.

4. Apparatus according to claim 1 wherein said first and second transducers comprise first and second synchro transmitters respectively and said means responsive to said transducers comprise first and second synchro receivers and means electrically connecting said first and second synchro receivers respectively to said first and second synchro transmitters.

5. Apparatus according to claim 4 wherein said means responsive to said transducers further comprises a screen; a light beam projector for projecting a light spot onto the screen; means mounting said projector for tilting movement about a horizontal axis and turning movement about a vertical axis; means mechanically coupling said first synchro receiver to said projector for tilting said projector about said horizontal axis; and means mechanically coupling said second synchro receiver to said projector for turning said projector about said vertical axis.

6. Apparatus according to claim 1 wherein said first and second transducers comprise potentiometers having respective sliders coupled by said first and second mechanical coupling means to said rotor and said frame respectively and said means responsive to said transducers comprise a power source, circuit means connecting said power source to said potentiometers to apply a predetermined voltage thereto and first and second voltage measuring means connected to said sliders of said first and second potentiometers respectively, said first voltage measuring means being calibrated to indicate a distance and said second voltage measuring means being calibrated to indicate an angular deviation.

7. Apparatus according to claim 11 wherein said frame includes a magnet disposed vertically below said rotor to attract said first counterweight and bias said rotor to an angular position in which said dummy golf ball is held erect.

References Cited

UNITED STATES PATENTS

| | | | |
|---|---|---|---|
| 2,018,291 | 10/1935 | Thompson | 273—185 |
| 2,259,918 | 10/1941 | Young | 273—185 |
| 2,402,274 | 6/1946 | Clarke | 273—185 |
| 2,528,616 | 11/1950 | Smith | 273—185 |

FOREIGN PATENTS 152,905   8/1953   Australia.

ANTON O. OECHSLE, *Primary Examiner.*

G. J. MARLO, *Assistant Examiner.*